United States Patent
Daniello et al.

(10) Patent No.: US 9,129,051 B2
(45) Date of Patent: Sep. 8, 2015

(54) AUTOMATIC TRAFFIC GENERATION FOR A FARING SYSTEM

(75) Inventors: Rudy Daniello, Nice (FR); Luc Isnardy, Cagnes sur Mer (FR); Claudine Reynaud, Grasse (FR); Eric S. Mountain, Biot (FR); Damien Ciabrini, Grasse (FR)

(73) Assignee: Amadeus S.A.S., Biot (FR)

( * ) Notice: Subject to any disclaimer, the term of this patent is extended or adjusted under 35 U.S.C. 154(b) by 1223 days.

(21) Appl. No.: 12/924,058

(22) Filed: Sep. 20, 2010

(65) Prior Publication Data

US 2012/0030057 A1    Feb. 2, 2012

(30) Foreign Application Priority Data

Aug. 2, 2010   (EP) ..................................... 10305855

(51) Int. Cl.
G06Q 30/00    (2012.01)
G06F 11/34    (2006.01)
(Continued)

(52) U.S. Cl.
CPC ........ *G06F 11/3414* (2013.01); *G06F 11/3466* (2013.01); *G06Q 10/02* (2013.01); *G06Q 30/0611* (2013.01); *G06F 2201/865* (2013.01); *G06F 2201/875* (2013.01)

(58) Field of Classification Search
USPC ............................................... 705/26.1–27.2
See application file for complete search history.

(56) References Cited

U.S. PATENT DOCUMENTS

2005/0251492 A1 * 11/2005 Bleumer ..................... 705/403
2008/0071629 A1 *  3/2008 Benson et al. .................. 705/26
2008/0086383 A1 *  4/2008 Steeb et al. ..................... 705/26
(Continued)

FOREIGN PATENT DOCUMENTS

GB    2399196 A    9/2004
GB    2417865 A    3/2006
(Continued)

OTHER PUBLICATIONS

Dey, S. S., & Fricker, J. D. (1994). Bayesian updating of trip generation data: Combining national trip generation rates with local data. Transportation (1986-1998), 21(4), 393. Retrieved from http://search.proquest.com/docview/211928800?accountid=14753.*
(Continued)

*Primary Examiner* — Kathleen Palavecino
(74) *Attorney, Agent, or Firm* — Wood, Herron & Evans, LLP

(57) ABSTRACT

A faring system includes a production facility including at least one fare shopping server, a staging facility including at least one fare shopping server, and an entry point for conducting bi-directional communications with customers. The staging facility further includes a database storing transformation rules and a traffic generation subsystem configured to receive a transaction via the entry point from a customer, to determine if the received request is one suitable for use in generating simulation data for the fare shopping server of the staging system and, if so, to modify the received transaction in accordance with at least one rule retrieved from the database to create at least one modified transaction, and to send the at least one modified transaction to the fare shopping server of the staging facility for processing. The fare shopping server of the staging facility processes the modified transaction for evaluating a potential new or modified functionality of the faring system.

20 Claims, 5 Drawing Sheets

(51) Int. Cl.
  *G06Q 10/02* (2012.01)
  *G06Q 30/06* (2012.01)

(56) References Cited

U.S. PATENT DOCUMENTS

2008/0262880 A1* 10/2008 Champernowne ................ 705/5
2010/0241544 A1*  9/2010 Benson et al. .................. 705/34
2011/0137666 A1*  6/2011 Zuida et al. .................... 705/1.1

FOREIGN PATENT DOCUMENTS

WO   WO 99/01819       1/1999
WO   WO 2009/105459 A2  8/2009

OTHER PUBLICATIONS

G. Ruffo et al., "WALTy: A User Behavior Tailored Tool for Evaluating Web Application Performance" Proceedings of the Third IEEE International Symposium on Network Computer and Applications, Aug. 30, 2004, pp. 77-86.

K. Kant et al., "Geist: A Generator for E-Commerce & Internet Server Traffic", Performance Analysis of Systems and Software, 2001, ISPASS. 2001 IEEE International Symposium on Nov. 4-6, 2001, Piscataway, NJ, IEEE Nov. 4, 2001, pp. 49-56.

Intellectual Property Office of Singapore, Written Opinion issued in application No. 201300730-7 dated Feb. 10, 2014.

* cited by examiner

AUTOMATIC TRAFFIC GENERATION FOR A FARING SYSTEM

TECHNICAL FIELD

The exemplary embodiments of this invention relate generally to faring systems and, more specifically, relate to the generation of pseudo-traffic (shadow traffic) for evaluating faring system modifications/enhancements. The various exemplary embodiments can be used in an on-line system providing travel-related products to customers.

BACKGROUND

Several terms used below are defined as follows.
Transactional Faring System
A system which is able to compute and return fare quotes based on criteria requested by customers such as cheapest fares which apply for a destination, and best fares around a given date. Customers communicate with the transactional faring system, also referred to herein as a faring system, by means of transactions, i.e., a question (request for fare quote) followed by an answer (computed fare quote).
Fare Shopping Servers
Fare shopping servers are transactional servers which implement the products provided by the faring system. These servers are in charge of computing responses to queries made by the customer. There are two kinds of fare shopping servers: those dedicated to production, those dedicated to staging.
Production
The production is an operational facility (a computer system) where computations take place in order to return answers to the queries made by customers.
Staging
Staging is a relatively small and dedicated part of the faring system where a new product can be "validated" before being publicly made available to customers.
Operational Validation
When a new product has been validated as "functionally" valid, it goes though a series of tests under real life conditions to ensure it is also "operationally" valid (i.e., the impact of the product on the entire faring system is assessed). This is referred to as operational validation.
Shadow Traffic
A part of the traffic (i.e., requests from customers) is duplicated by the faring system to serve as a source of traffic for staging. The responses to this duplicated traffic (referred to as the shadow traffic) are not returned to customers.

The exemplary embodiments of this invention pertain most particularly to a transactional faring system whose purpose is to compute and return the best fare quotes based on criteria requested by customers: e.g., cheapest flights for a given destination and date, best flight fares around a given date, etc. These services are treated via fare shopping servers and accessed at a high rate (e.g., 90 million transactions per day).

Forecast changes in the faring system (e.g., new products, new volumes, new customers) are preceded by operational validations to ensure that the system can cope with the expected additional resource consumption (e.g., CPU, memory, database, network and other resources).

Operational validations are implemented by means of shadow traffic. That is to say, a part of the incoming customer traffic is duplicated from the production facility, without customer awareness. This duplicated, shadow traffic is then forwarded to a phantom operational facility referred to as the staging facility intended to test evolutions in the faring system. The effect of this shadow traffic run on the staging facility is then monitored and analyzed, while the original traffic is processed in a normal fashion by the production facility and returned to customers in a normal manner.

When introducing such production evolutions (e.g., new markets, new dimension, new products) cases can arise where the existing traffic is not suitable for operational validations. In such cases, it is necessary to simulate traffic in order to generate the inputs necessary for performing the validations.

It can be noted that several techniques might be envisioned to obtain relevant traffic for operational validations.

For example, one such possible technique would be to activate the evolution to one client at a time. In this possible approach the evolution (e.g., new product, new market) would be provided by the faring system and enabled only for a few clients in a first phase. It can be expected that the total resources consumed for processing the new service will have a limited impact on the overall production facility, and this cost can be analyzed precisely for creating accurate capacity planning.

However, this approach involves requesting clients to begin sending new traffic, which may be difficult. There is a risk that the traffic generated even by a few clients consumes more resources than expected and which can consequently endanger the operational stability of the faring system. Another drawback is that this scheme is not applicable in a case where it is a prerequisite to simultaneously open the new service to all clients.

Another possible technique would be to generate traffic from pre-recorded existing traffic. That is, one might record existing customer traffic for a given period of time and then transform this recorded traffic off-line (e.g., from disk) to make it appear as traffic that will target the new product. The transformed traffic can then be replayed manually while monitoring the resources consumed by the processing of the new service on the pre-recorded and transformed traffic.

However, replaying pre-generated traffic does not offer sufficient diversity, especially when the validation needs to be run over a long period of time. Moreover, is very difficult to mimic a pace of the replay which looks like actual traffic. At least these two shortcomings result in incomplete benchmarking and thus result in inaccurate capacity planning.

Another possible technique would be to convert the contents of incoming requests before they are processed. For example, a converter unit can be put in front of the real servers to modify the contents of incoming requests, for example, for enabling new features (i.e. new options) of a product provided by the faring system. No off-line storage need be involved in this process.

However, this approach is not practical in practice as its operation impacts customers of the production facility. For example, those clients whose traffic is modified can be given responses for different requests that what they have asked for, resulting in customer confusion and the possibility of alienating these customers.

Another approach would be to copying all the incoming requests from customers and use them on an adjacent server. This way, only realistic traffic is used without bothering the customers.

However, this method generates an important amount of data especially since customer traffic varies depending on the day and date, special offers, holidays and so on. So the server can actually be overloaded with much more traffic than it can handle, including a lot of useless information.

SUMMARY

The foregoing and other problems are overcome, and other advantages are realized, in accordance with the embodiments of this invention.

In one aspect thereof the exemplary embodiments provide a method performed by a faring system having a production facility comprising at least one fare shopping server, a staging facility comprising at least one fare shopping server, and an entry point for conducting bi-directional communications with customers. The method is characterized as comprising, in response to receiving a transaction from a customer, sending the transaction to the fare shopping server of the production facility for processing and also to a traffic generation subsystem that forms a part of the staging facility; selectively modifying the received transaction at the traffic generation subsystem in accordance with at least one rule to create at least one modified transaction; and sending the at least one modified transaction to the fare shopping server of the staging facility for processing.

In another aspect thereof the exemplary embodiments provide a faring system that comprises a production facility comprising at least one fare shopping server, a staging facility comprising at least one fare shopping server, and an entry point for conducting bi-directional communications with customers. The faring system is characterized in that it further comprises a database storing transformation rules and a traffic generation subsystem configured to receive a transaction via the entry point from a customer, to determine if the received transaction is one suitable for use in generating simulation data for the fare shopping server and, if so, to modify the received transaction in accordance with at least one rule retrieved from the database to create at least one modified transaction, and to send the at least one modified transaction to the fare shopping server of the staging facility for processing.

In another aspect thereof the exemplary embodiments provide a faring system that comprises production facility means having at least one fare shopping server means, staging facility means comprising at least one fare shopping server means, and entry point means for conducting bi-directional communications with customers including receiving transactions from customers and sending received transactions to said fare shopping server means of the production facility means for processing and for sending the received transactions to said staging facility means as shadow transactions. The faring system comprises means for selectively modifying a shadow transaction received from said entry point means at the staging facility means in accordance with at least one rule obtained from a rules database to create at least one modified shadow transaction. The rules database comprises at least a set of transformation rules and a set of execution rules. The faring system is further characterized as comprising means for sending the at least one modified shadowed transaction to the fare shopping server means of the staging facility means to be processed for evaluating a potential new or modified functionality of the faring system.

In another aspect thereof the exemplary embodiments provide a faring system that comprises production facility means having at least one fare shopping server means, staging facility means comprising at least one fare shopping server means, and entry point means for conducting bi-directional communications with a customer. The faring system comprises means for determining if a received customer transaction (request) is one suitable for use in generating simulation data for the fare shopping server means; means for modifying a suitable customer transaction received from said entry point means at the staging facility means in accordance with at least one rule obtained from a rules database to create at least one modified transaction. The rules database comprises at least a set of transformation rules and a set of execution rules. The faring system is further comprising means for sending the at least one modified transaction to the fare shopping server means of the staging facility means to be processed, and means for sending to the customer a result of the processed modified transaction for use by the customer in evaluating a potential new or modified functionality of the customer.

BRIEF DESCRIPTION OF THE DRAWINGS

The foregoing and other aspects of the presently preferred embodiments of this invention are made more evident in the following Detailed Description of the Preferred Embodiments, when read in conjunction with the attached Drawing Figures, wherein.

DETAILED DESCRIPTION

Figure 1:
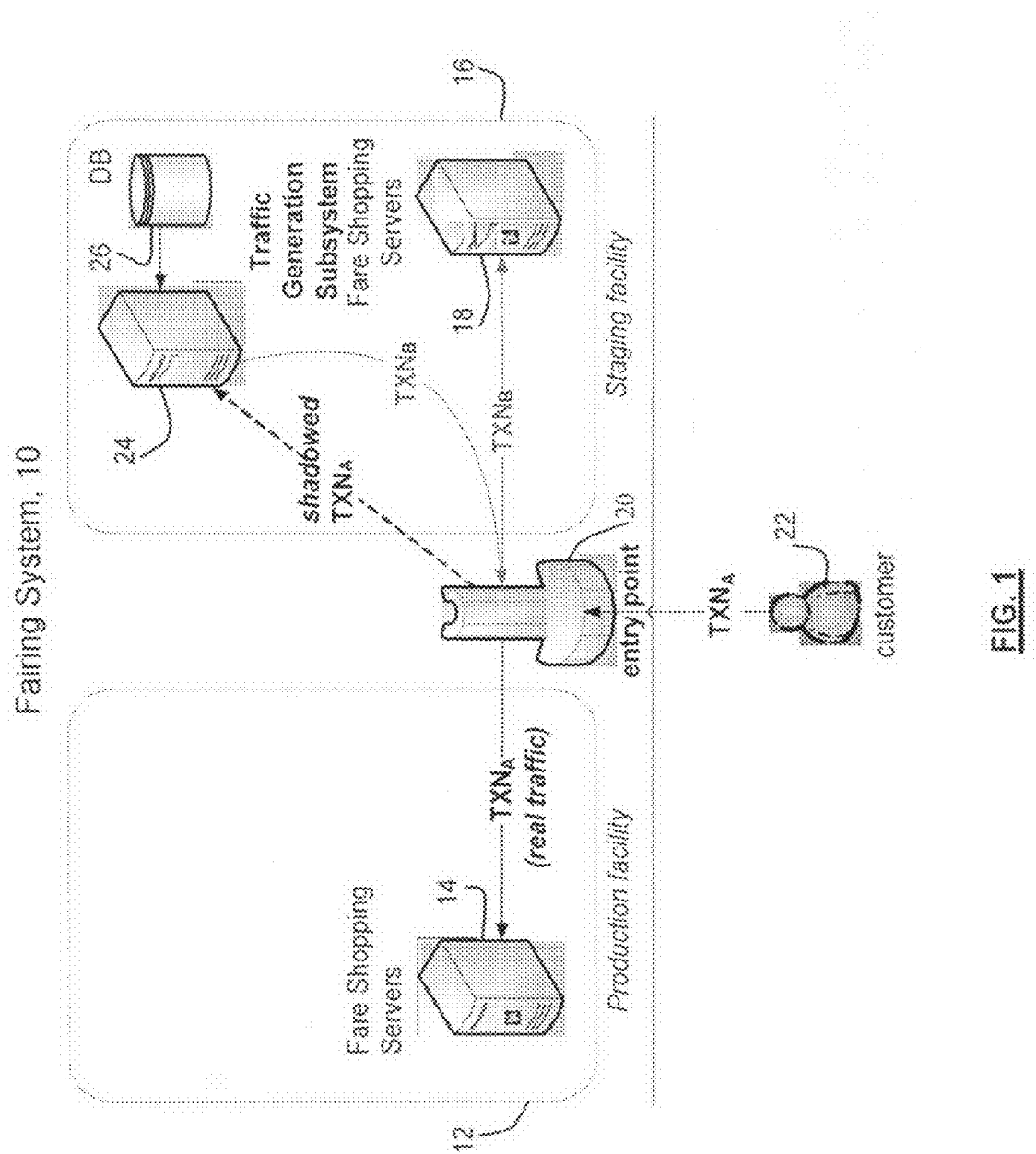
FIG. 1 shows a faring system that is constructed and operated in accordance with the exemplary embodiments of this invention to include a traffic generation subsystem and a transformation rules database.

By way of introduction, the present invention describes a novel system that interacts with a transactional faring system in order to generate any desired traffic from existing traffic coming from the faring system's operational facility.

As will be described in detail below, the exemplary embodiments of this invention provide an autonomous system based on a generic framework whose purpose is to transform incoming traffic to resemble new traffic and send it to staging facility fare shopping servers. The framework is driven by a dedicated knowledge database to determine how to transform the incoming transactions and how to populate new fields present in the generated transactions (e.g., possible valuations of fields, inter-relation between field values, etc.). The system adapts its transformations per market depending on the incoming shadow transaction that it receives. The system can rely on plug-ins for business transformations when ad-hoc generation is required (e.g., complex or domain-specific data manipulation). Real-time traffic transformation allows the system to generate diversified transactions continuously, and thus to provide a high level of confidence in the measurements of resource consumption performed during operational validations. The system has the ability to generate as much traffic as is necessary, whatever the amount of incoming traffic happens to be. The system does not impact the production client operations since it operates on shadow traffic, and does not need direct customer intervention to operate. Further, the system throttles traffic generation automatically for operational stability (e.g., to preserve external production systems connected to the staging facility).

The use of the exemplary embodiments of this invention also provides a number of business-related advantages. For example, the generic transformation framework enables the generation of traffic suitable for simulating a broad variety of situations (e.g., stress test, endurance, robustness, capacity, limits). The generated traffic can be used to test the limits or the corner cases of new products, something which in practicality cannot be achieved with real customer traffic. Further, the accuracy of generated traffic improves the confidence in the metrics gathered during operational validations, which is an important factor when considering the accuracy of capacity planning. The reduced dependency on customers also aids in improving the time to market of new products deployed in the faring system. In addition, the automatically generated traffic reduces the time spent in performing operational validations, thereby reducing cost. Further, the use of the exemplary embodiments of this invention aids in maintaining the operational quality of production facility for daily operations, while reducing the risk of inducing instability during the introduction of new customers or new products in the faring system. The use of the exemplary embodiments of this invention also enables customers to perform their own capacity planning to monitor the impact of new products on their own operational facility.

For example, exemplary embodiments of this invention can use a generic traffic transformation approach rather than relying on manual transformations. That is, the system generates traffic, based on business transformation rules stored in a knowledge database, and is capable of accommodating plural traffic transformations at one time. This provides a versatile traffic simulator suitable for a broad variety of operational validations. The system alleviates the need to design a new traffic transformer manually each time an operational validation must be performed, thereby reducing the cost of operational validations as compared to maintaining a manually-derived, hand-written traffic transformer.

The exemplary embodiments provide real time and accurate traffic generation that greatly improves operational validations. The traffic generation is performed on live traffic, and can thus provide day-long operation. This approach allows reproducing all of the traffic behaviours that are typically seen in production, such as changes in transactions per second, as well as transaction stress peaks at specific times during the day. The pace of sending and the relevance of the generated traffic make the use of this invention very effective at extensively testing new products (e.g., limit behaviours and corner cases). The use of the exemplary embodiments enables the faring system to be extensively and realistically stress tested.

The exemplary embodiments also operate in a transparent manner with respect to production, and are transparent to customers, as transactions are generated from shadow traffic without impacting production performance. The system of this invention does not return data to production. The system is also transparent to staging fare shopping servers as it acts as a standalone interposition server between shadow traffic and staging fare shopping servers. The fare shopping servers are not aware that they receive generated traffic and do not need to be modified to handle the received traffic.

The system can also throttle or suspend the generation of traffic in the event that it sends too much generated traffic to the staging fare shopping servers, or in the event that the generated traffic results in some technical problem. In case the staging faring system needs to contact external production facilities (e.g. customer booking flights availability servers) mitigation of the effect of too much generated traffic is achieved.

Reference can be made to FIG. 1 for showing a faring system 10 that is constructed and operated in accordance with the exemplary embodiments of this invention. The faring system 10 includes a production facility or system 12 containing fare shopping servers 14 and a staging facility or system 16 also containing fare shopping servers 18. The production facility 12 and the staging facility 16 are communicatively coupled to an entry point 20 through which customers 22 gain access to the faring system 10, and through which they receive responses to queries. The entry point 20 provides real traffic ($TXN_A$) received from the customers 22 to the fare shopping servers 14 of the production facility 12. Note that in an exemplary application and use case the production facility 12 may have no knowledge of the existence and/or operation of the staging facility 16.

In accordance with the exemplary embodiments the staging facility 16 further includes a traffic generation server or subsystem 24 coupled with a database 26 storing various business transformations and other information used by the traffic generation subsystem 24 during operation of the traffic generation subsystem 24.

The exemplary embodiments of this invention thus include as one aspect thereof the new traffic generation subsystem 24 in the faring system 10. The faring system 10 provides several products served by the fare shopping servers 14. The faring system 10 is basically duplicated in two facilities. The first facility is the production facility 12, which is responsible for processing production requests coming from customers 22. The second facility is the staging facility 16, essentially a private facility used during operational validations for staging new services, new markets, etc.

In FIG. 1 the production faring facility 12 is shown serving a request from a customer 22 which is targeting product A by issuing the $TXN_A$. It can be assumed that certain operational validations are on-going to stage a new product B which is going to be made available in the production facility 12. In order to stage this service, some traffic $TXN_B$ must be available to the fare shopping servers of the staging facility 16. This traffic $TXN_B$ is generated by the traffic generation subsystem 24.

When a client (customer 22) makes the request $TXN_A$ to the faring system 10 the entry point 20 makes a copy of this request (shadowed $TXN_A$) and routes it to the traffic generation subsystem 24 in the staging facility 16. The traffic generation subsystem 24 generates a new request $TXN_B$ and sends a collateral transaction (via entry point 20) to the staging fare shopping servers 18 for further monitoring. Meanwhile, the customer 22 receives the response it expects from $TXN_A$, without being impacted by the ongoing operational validation being performed by the staging facility 16.

The traffic generation subsystem 24 which implements the invention is preferably configured to listen and respond to any kind of transaction defined in the faring system 10, and to thus to be able to receive any input traffic.

Figure 2:
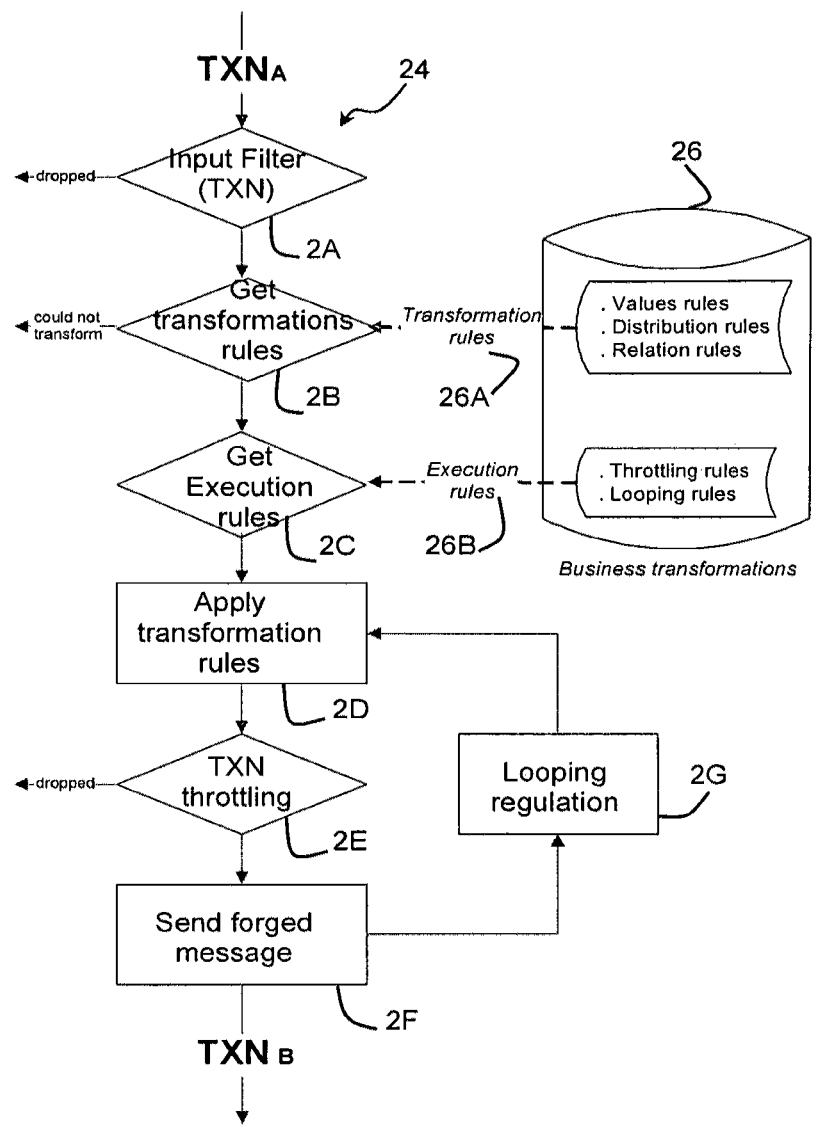
FIG. 2 is a logic flow diagram that illustrates the operation of the traffic generation subsystem of FIG. 1 when transforming a given $TXN_A$ into at least one $TXN_B$.

Referring also to FIG. 2, the traffic generation subsystem 24 operates to selectively transform a given $TXN_A$ into one or more (at least one) $TXN_B$. The generation of this pseudo-traffic follows a technique driven by transformations, also referred to herein as business transformations, stored in the dedicated database 26. At Block 2A, the traffic generation subsystem 24 checks by using an input filter whether the incoming $TXN_A$ can be used as a source of traffic for the on-going operational validation. If not, the $TXN_A$ is dropped (ignored) and is thus not transformed into at least one $TXN_B$.

Assuming that the incoming $TXN_A$ can be used, then depending on the contents of the fare shopping request $TXN_A$ (e.g., outbound flight, inbound flight, operating carrier, travel agency, etc.) the traffic generation subsystem 24 fetches from the business transformations database 26 a list of transformation rules 26A that should be applied to generate new traffic. The transformation rules 26A can include, as non-limiting examples, values rules, distribution rules and relation rules. If no transformation rule is found to apply, the transaction is dropped. Assuming that a transformation rule 26A is found to be applicable, at Block 2C the traffic generation subsystem 24 then checks execution rules 26B that should apply for the generated traffic (e.g., number of transactions to generate from the input, the sending pace, etc.) As shown in FIG. 2, the execution rules 26B can include, for example, throttling rules and looping rules. The traffic generation subsystem 24 then applies, at Block 2D, the applicable transformation rule(s) 26A to generate one $TXN_B$, and at Block 2F sends the generated $TXN_B$ to the fare shopping servers 18 for processing (via the entry point 20). Note that this process can be recursive, and can be repeated until the amount of traffic indicated by the execution rules 26B is reached. This recursion is depicted in FIG. 2 by the Blocks 2E and 2G.

The traffic generation subsystem 24 thus generates traffic by applying the series of transformation rules 26A and execution rules 26B. The applicable rules 26A, 26B are stored in the dedicated database 26. Typically, the database 26 can be populated manually depending on the needs of the operational validation. For traffic to be generated it is sufficient to have at least one rule defined in the database 26. As a corollary, not all types of rules need to be present in the database 26.

Discussing now in further detail the rules 26A, 26B, a particular transformation rule 26A specifies: the type of input it applies to, a set of rules to apply in order to generate a new output ($TXN_B$), and a name of (or some other type of reference to) one or more of the execution rules 26B. Some rules can express a simple data mapping, e.g., that the values of fields from $TXN_A$ are copied to fields in $TXN_B$. Other rules can express how to provide a value to new fields in $TXN_B$. These rules, which can be referred to as the valuation rules, define a list of fields (e.g., carrier, market, city, etc.) which will be inserted in the generated requests, along with a list of values which can be generated for each field. For example, a valuation rule can specify to add a city field with either NYC or PAR as the possible values. Distribution rules specify the frequency at which values are generated for a field. In accordance with the example above, one exemplary distribution rule could generate the value PAR 60% of the time, and NYC 40% of the time. Relation rules specify how a field valuation affects the valuation of other fields. Relation rules can be used, for example, to model semantic dependencies between fields, or to blacklist (prohibit) certain combinations of valuations.

For properties which do not match the generic approach, an ad-hoc transformation can be performed using a plug-in. This can be useful when the generation logic depends on, for example, some specific complex business constraints (e.g. generation based on geographic constraints).

An execution rule 26B specifies looping and traffic regulation for the traffic generated from an input transaction. Looping rules specify how many transactions to generate from an input TXN. This can be useful in a case where the real production traffic is not available in sufficient quantity for the needs of the operational validation. In this case then it can be specified to generate n $TXN_B$ from a single $TXN_A$, where n can be equal to one or greater than one. Another type of execution rule 26B are regulation rules that define how to send the generated traffic, for instance the frequency of sending in TPS (transactions per second). The sending function auto-regulates itself to send less traffic if the generated traffic yields too many technical errors (for instance, too many transaction time outs are generated)

Several exemplary use cases are now described in order to further explain the to operation of the invention, and the benefits and technical effects that are gained through the use of the invention.

A first use case example concerns increasing the number of flight recommendations returned to a customer.

Assume that within the faring system 10 the customer 22 has access to a product A which returns the least expensive flights for a given journey (departure plus destination) on a given date and operated by a given carrier. The faring system 10 returns recommendations for the least expensive flights which match the customer criteria.

Figure 3:
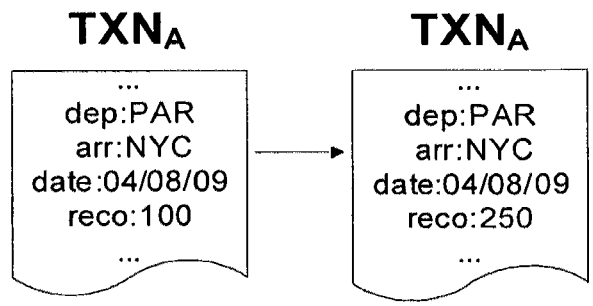
FIG. 3 shows an increase in a maximum number of recommendations.

Assume that the customer has the right to request up to 100 flight recommendations, and that it is desirable to test how the faring system 10 would behave if the maximum number of recommendations is raised to a larger value (e.g., to 250 flight recommendations), as shown in FIG. 3.

The evolution of this product can be implemented with the following constraints in mind. First, the customer 22 cannot be granted the right to request more flight recommendations, as this may endanger the operational stability of the faring system 10. In addition, the maximum number of flight recommendations which can be computed by the faring system 10 is unknown, and needs to be estimated beforehand.

Given the constraints above, the traffic generation subsystem 24 can be configured with the following transformation rules (stored in the database 26):
one valuation rule which determines the range of flight recommendations number requested by the customer;
one distribution rule that specifies that the recommendation values are generated randomly; and
one relation rule that specifies that if the input traffic requests more recommendations than the generated output, keep the largest number of recommendations.

Figure 4:
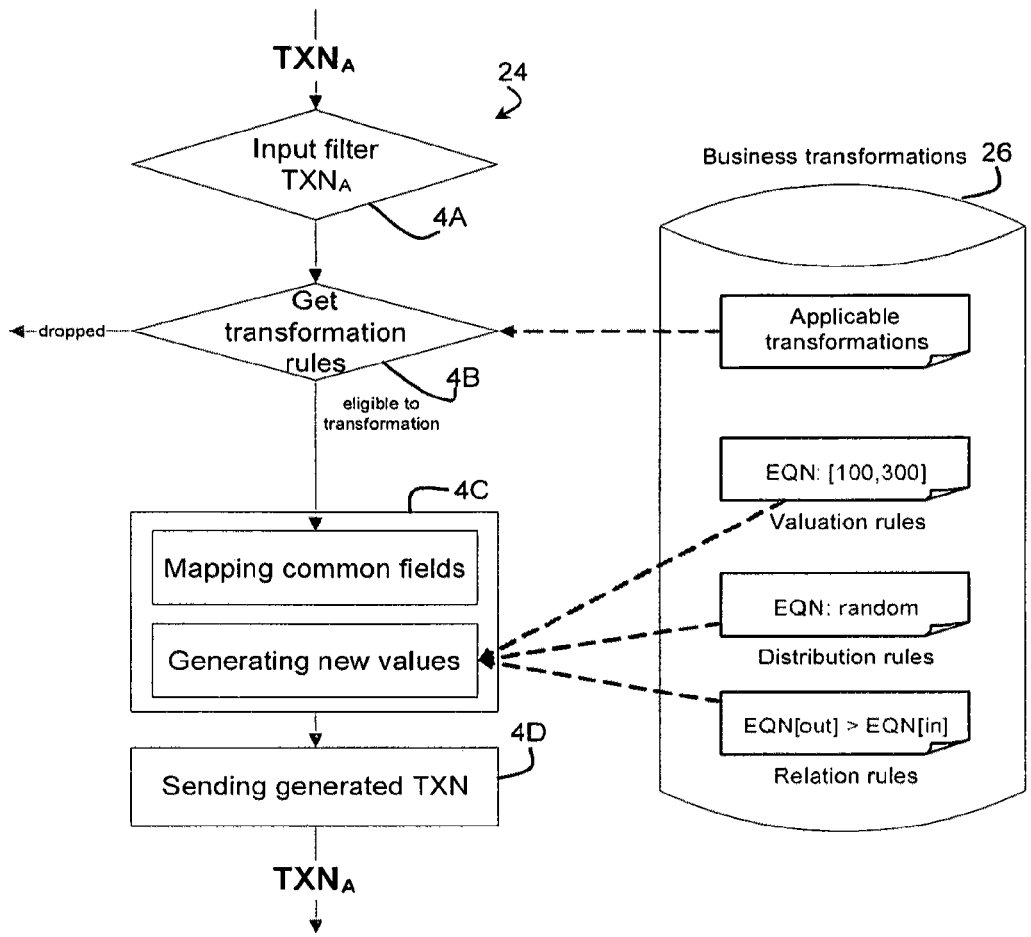
FIG. 4 illustrates various steps which occur in the traffic generation subsystem of FIG. 1 during the generation of the new (transformed) shadow traffic.

The sequence shown in FIG. 4 illustrates the various steps which occur in the traffic generation subsystem 24 during the generation of the new (transformed) shadow traffic.

Blocks 4A and 4B are basically identical to Blocks 2A and 2B of FIG. 2. In this case traffic captured from the production facility is transmitted to the traffic generation subsystem 24. The input filter (Block 4A) only retains the traffic related to product A.

At Blocks 4C and 4D, during the operational validation the valuation rule is updated manually to change the range of flight recommendations number (first [100,300], then [200, 400], then [300,500], etc.) until a new acceptable value for "maximum recommendations" is determined. This incremental approach aids in determining the limits of the faring system 10, something which would have been difficult or impossible to achieve if one were to rely on the use of only real production traffic.

A second exemplary use case concerns generating complex itineraries for a specific carrier.

Assume as a non-limiting example that a Japanese customer which currently uses Product B will soon use a new product B' provided by the faring system 10. The customer 22 will request fare quotes for a journey comprising "complex itineraries", such as the least expensive fares for journeys involving at least four flights (domestic or international) over a given date range. Assume further that at present the customer traffic targeting product B only contains domestic requests composed of, at most, two flights.

In order to generate relevant traffic for operational validation, the traffic to generation subsystem 24 is configured to process transactions from this Japanese client only. The traffic generation subsystem 24 applies the following rules (see also FIG. 5 and FIG. 6).

Transformation Rules:

One valuation rule: new international flights are inserted in incoming requests. Cities inserted are all accessible from Japan in one direct flight.

One distribution rule: international flights are inserted randomly in the flight segments of the generated request.

Figure 5:
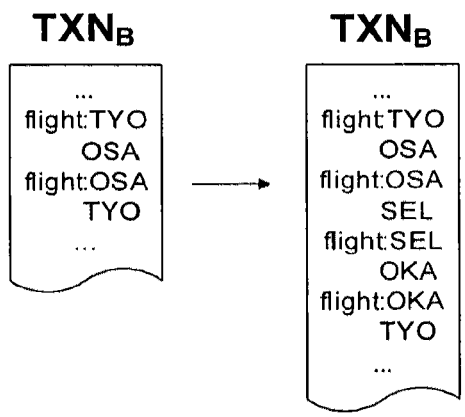
FIG. 5 shows an increase in a number of requested flights from a first transaction to a second, modified transaction.

One relation rule: a semantic relation specifies that inserted flights must be chosen such that all flights remain consecutive in the flight request (as depicted in FIG. 5).

A second relation rule: whatever the number of flight segments present in the original request (either one or two), there must be four flight segments in the generated request.

Execution Rules:

One regulation rule: new transactions must not be sent at a frequency that is greater than 10 TPS so as not to exceed computational capacity.

In the foregoing example assume that for an incoming $TXN_b$, not all three constraints (i.e., cities inserted are all accessible from Japan in one direct flight, inserted flights must be chosen such that all flights remain consecutive in the flight request, and there must be four flight segments in the generated request) can be enforced at the same time. In this case, the input filtering function would simply drop the incoming $TXN_b$, and no transaction would be generated.

Figure 6:
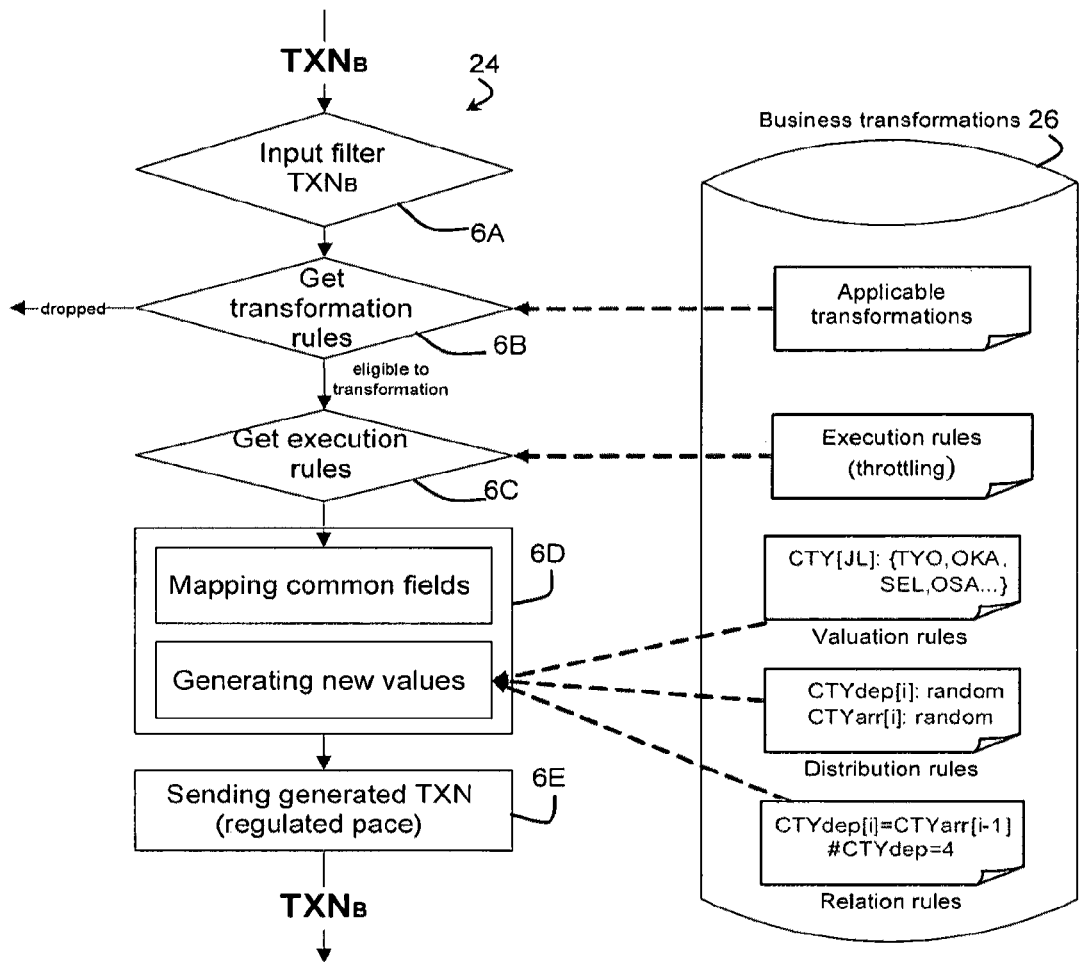
FIG. 6 illustrates various steps which occur in the traffic generation subsystem of FIG. 1 during the generation of the new (transformed) shadow traffic in accordance with the example of FIG. 5.

FIG. 6 illustrates the various steps which occur in the traffic generation subsystem 24 during the generation of the new traffic ($TXN_B'$) from the production traffic $TXN_B$. The Blocks 6A, 6B and 6C are substantially the same as Blocks 2A, 2B and 2C, respectively, of FIG. 2. Traffic headed to the production facility 12 is captured (i.e., duplicated) by the entry point 20 and is transmitted to the traffic generation subsystem 24, and only traffic related to product B ($TXN_B$) is kept. That is, traffic which does not correspond to the Japanese client (and to product B) is simply dropped. Requests are processed according to the valuation rules in Block 6D, and the new traffic ($TXN_B'$) is sent to the staging facility fare shopping servers 18. The newly-generated transactions are dropped before being sent if the amount of generated traffic per second exceeds the limit imposed by the execution rule related to throttling (10 TPS in this example).

A third exemplary use case concerns performing operational validation on client facilities.

Figure 7:
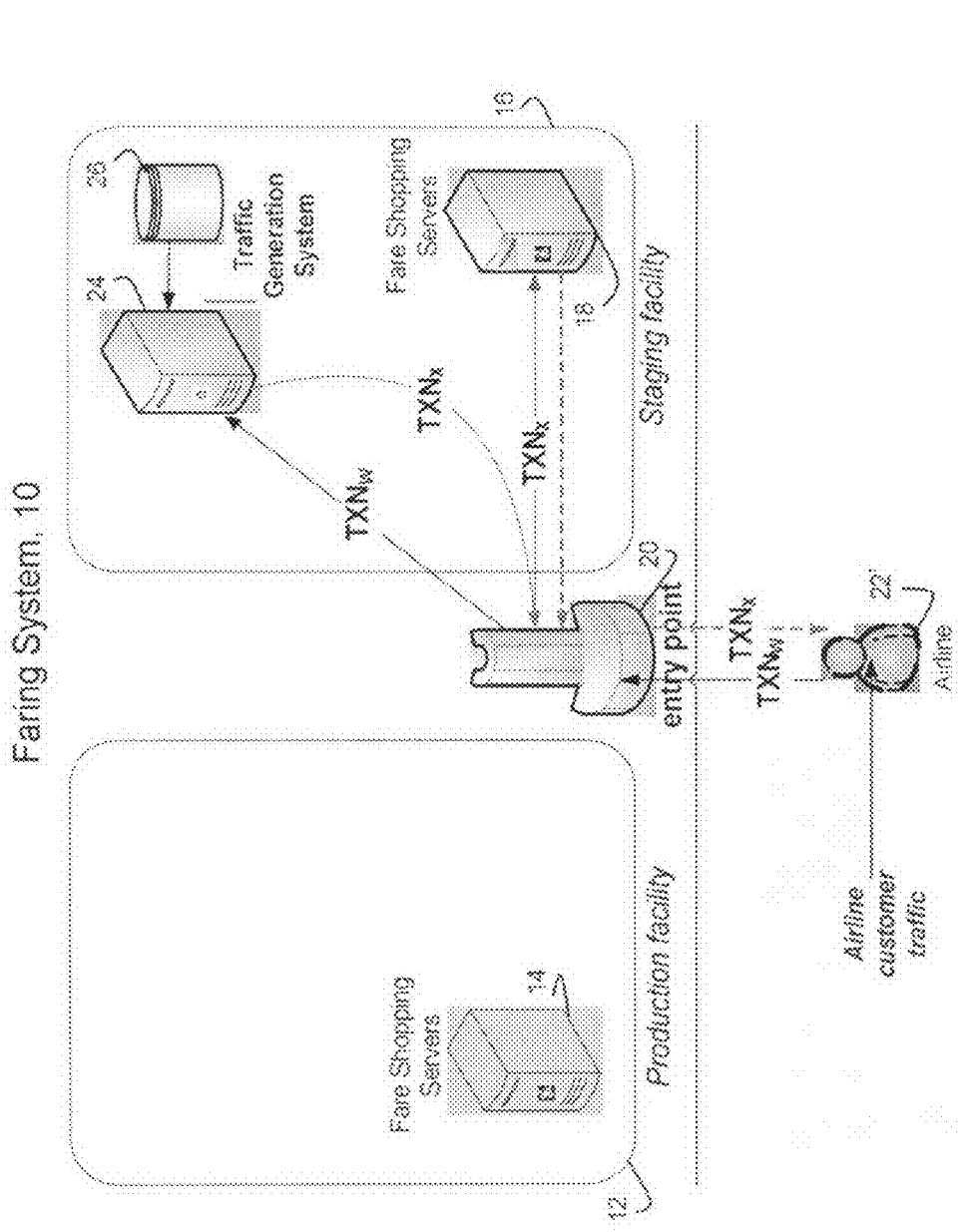
FIG. 7 shows the faring system that is constructed and operated in accordance with the exemplary embodiments of this invention to include the traffic generation subsystem and the transformation rules database when operated to return information to client for use by the client in characterizing a new product.

Assume that an airline (referred to herein as a client 22') is about to deploy a new service on its Web portal. This service makes use of a new product X of the faring system 10. Reference in this regard can be made to FIG. 7, which is similar in several respects to FIG. 1.

Before opening production, the amount of information returned by the faring system 10 to the client airline is not known precisely. In order to ensure that the client's Web infrastructure will be able to process the amount of data returned by the faring system 10, the client desires to test its own service (for new product X) before opening it in production. Assume also that the client does not wish to perform its operational validation manually, and needs an existing source of traffic to simulate the new traffic and to verify the operational stability of the client's Web infrastructure.

In this scenario it is possible to provide the client 22' with private access to the traffic generation subsystem 24 of the staging facility 16. Having achieved the private access, the client 22' sends traffic (e.g., pre-recorded traffic transactions, duplicated traffic and/or traffic obtained by the client 22' by whatever means) that is directed to the traffic generation subsystem 24 ($TXN_W$). This traffic is transformed in accordance with business transformations stored in database 26 into traffic $TXN_X$ that is supplied to the staging system fare shopping servers 18. In this case the business transformations are selected to implement transaction messages that pertain to the new service to be launched by the airline client 22'. The output of the fare shopping servers 18 is subsequently returned as $TXN_X$ traffic to the airline client 22', thereby enabling the client 22' to test its Web infrastructure prior to the actual launch of the new service in conjunction with the faring system 10. That is, the traffic generation subsystem 24 generates the relevant transactions and passes them to the staging system fare shopping servers 18 for processing. The responses from the fare shopping servers 18 are forwarded to the client 22', who is then able to process the data and perform its own operational validation.

It is pointed out that the various blocks shown in FIGS. 2, 4 and 6 can represent operations carried out in response to the execution of computer program instructions by one or more data processors that form a part of the traffic generation subsystem 24, in cooperation with the knowledge model (transformation rules, execution rules) stored in the business transformations database 26. These computer program instructions are considered to be stored in or on some suitable computer-readable medium, such as fixed or removable disk and/or fixed or removable semiconductor memory or memories, which form a part of the traffic generation subsystem 24. Alternatively, the various blocks shown in FIGS. 2, 4 and 6 can be viewed as interconnected hardware elements that are configured to carry out the specified functions in cooperation with the knowledge model (transformation rules, execution rules) stored in the business transformations database 26. Alternatively, the various blocks shown in FIGS. 2, 4 and 6 can be viewed as being a combination of computer program instructions and interconnected hardware elements.

Further, each of the production facility 12, staging facility 16 and fare shopping servers 14 and 18 can each be implemented using one or co-located or distributed data processing platforms executing computer program code. In some embodiments all of this functionality may be implemented on a single data processing platform.

The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims. As but one example, the use of other similar or equivalent faring system architectures may be attempted by those skilled in the art. However, all such and similar modifications of the teachings of this invention will still fall within the scope of the embodiments of this invention.

Further, the various names used for the described system components (e.g., production facility, staging facility, fare shopping server(s), traffic generation subsystem, etc.) are not intended to be limiting in any respect, as these various system components may be identified by any suitable names. For example, the traffic generation subsystem 24 could be referred to, without a loss of generality, as a traffic emulation unit or as a shadow traffic transformation system, as two non-limiting examples.

Further, it should be appreciated that the use of the exemplary embodiments is not limited to only airline reservationrelated purposes, but can be used for making other types of reservations (e.g., train, bus, automobile, hotel, etc.)

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method performed by a faring system having a production facility comprising a first fare shopping server, a staging facility comprising a second fare shopping server and a traffic generation subsystem, and an entry point for conducting bi-directional communications with a customer, the method comprising:
   receiving a request from the customer at the entry point, the request including a plurality of fields each having a value;
   in response to receiving the request, sending, by the entry point, a first copy of the request to the first fare shopping server for processing and a second copy of the request to the traffic generation subsystem;
   determining, by the traffic generation subsystem, if the second copy of the request can be used to evaluate a new or modified functionality of the faring system using an input filter;
   in response to a determination that the second copy of the request can be used to evaluate the new or modified functionality, retrieving, by the traffic generation subsystem, a transformation rule from a rules database, the transformation rule specifying a set of rules for transforming the request that includes a data mapping rule and a valuation rule;
   modifying, by the traffic generation subsystem, the second copy of the request in accordance with the set of rules to create a modified request by:
     copying at least one value of one field of the second copy of the request to a corresponding field in the modified request based on the data mapping rule,
     inserting each field from a list of fields defined by the valuation rule into the modified request, and
     for each field from the list of fields, selecting one value from a list of values defined by the valuation rule for the field to generate in the field; and
   sending, by the traffic generation subsystem, the modified request to the second fare shopping server for processing.

2. The method of claim 1 wherein the set of rules further comprises a distribution rule or a relation rule.

3. The method of claim 2 wherein the distribution rule specifies a frequency at which a particular value from the valuation rule is used when generating the modified request.

4. The method of claim 3 further comprising:
   in response to the set of rules including the distribution rule, adjusting the frequency at which the particular value is used when generating the modified request.

5. The method of claim 2 wherein the relation rule specifies an effect of one value of a field in the modified request on a value of at least one other field in the modified request.

6. The method of claim 1 further comprising:
   retrieving at least one execution rule from the rules database, wherein the at least one execution rule is selected from a set of execution rules stored in the rules database.

7. The method of claim 6 wherein the set of execution rules comprises a looping rule or a regulation rule.

8. The method of claim 7 wherein the looping rule specifies a number of modified requests to be generated from the second copy of the request.

9. The method of claim 7 wherein the regulation rule specifies a maximum number of modified requests per unit time to be sent to the second fare shopping server.

10. The method of claim 1 wherein sending the first copy of the request to the first fare shopping server, modifying the second copy of the request, and sending the modified request to the second fare shopping server are performed by at least one data processor executing computer software instructions.

11. The method of claim 1 wherein the received request comprises an air travel-related information request.

12. The method of claim 1 wherein the input filter includes one or more constraints, and determining if the second copy of the request can be used to evaluate a new or modified functionality of the faring system comprises:
   determining, based on the value of each field of the second copy of the request, if the one or more constraints can be enforced at the same time.

13. The method of claim 1, wherein the transformation rule further specifies a type of request to be modified, and a reference to one or more execution rules for the modified request.

14. A faring system comprising:
   a production facility comprising a first fare shopping server,
   a staging facility comprising a second fare shopping server, a traffic generation subsystem, and a rules database; and
   an entry point coupled to the production facility and the staging facility for conducting bi-directional communications with a customer, the entry point configured to:
     receive a request from the customer, the request including a plurality of fields each having a value,
     in response to receiving the request, send a first copy of the request to the first fare shopping server for processing, and
     send a second copy of the request to the traffic generation subsystem, and wherein the traffic generation subsystem is configured to:
   determine if the second copy of the request can be used to evaluate a new or modified functionality of the faring system using an input filter;
   in response to a determination that the second copy of the request can be used to evaluate the new or modified functionality, retrieve a transformation rule from the rules database, the transformation rule specifying a set of rules for transforming the request that includes a data mapping rule and a valuation rule;
   modify the second copy of the request in accordance with the set of rules retrieved from the rules database to create a modified transaction request by:
     copying at least one value of one field of the second copy of the request to a corresponding field in the modified request based on the data mapping rule,
     inserting each field from a list of fields defined by the valuation rule into the modified request, and
     for each field from the list of fields, selecting one value from a list of values defined by the valuation rule for the field to generate in the field, and
   send the modified request to the second fare shopping server for processing.

15. The faring system of claim 14 wherein the set of rules further comprises a distribution rule or a relation rule.

16. The faring system of claim 15 wherein:
the distribution rule specifies a frequency at which a particular value from the valuation rule is used when generating the modified request, and
the relation rule specifies an effect of one value of a field in the modified request on a value of at least one other field.

17. The faring system of claim 14 wherein the traffic generation subsystem is further configured to retrieve at least one execution rule from the rules database, the at least one execution rule being selected from a set of execution rules stored in the rules database.

18. The faring system of claim 17 wherein the set of execution rules comprises a looping rule or a regulation rule.

19. The faring system of claim 18 wherein the looping rule specifies a number of modified requests to be generated from one received request, and the regulation rule specifies a maximum number of modified requests per unit time to be sent to the second fare shopping server.

20. The faring system of claim 14 wherein the request received from the customer comprises an air travel-related information request.

\* \* \* \* \*